July 4, 1944.　　　V. J. SCHAEFER　　　2,352,976
LIGHT-DIVIDING ELEMENT
Filed April 12, 1941

Inventor:
Vincent J. Schaefer,
by Harry E. Dunham
His Attorney.

Patented July 4, 1944

2,352,976

UNITED STATES PATENT OFFICE 2,352,976

LIGHT-DIVIDING ELEMENT

Vincent J. Schaefer, Schenectady, N. Y., assignor to General Electric Company, a corporation of New York Application April 12, 1941, Serial No. 388,295

1 Claim. (Cl. 88—1)

The present invention relates to improved means for dividing light into reflected and transmitted components.

Division of light in the manner specified is frequently desirable in optical systems. For example, in typical camera constructions, it is customary, in order to obtain a visible image of the scene on which the camera is focused, to divert a portion of the light entering the camera upon a ground-glass viewing screen. This is accomplished by projecting the light through an appropriately oriented element which is adapted to reflect a minor fraction of it on the viewing screen.

For performing the reflecting function use has been made of a normally transparent body having on one surface a coating of silver or aluminum applied with such thickness as to assure reflection of a minor percentage of the impinging light while permitting the transmission of the balance. In the use of such a system, however, two difficulties arise. In the first place, silver and aluminum coatings, no matter how thinly applied, absorb a certain proportion of the light projected through them, this light being lost as far as the performance of any useful function in the optical system is concerned. In the second place, if the coated element consists of a sheet of glass, for example, confusing double-image effects are encountered due to the occurrence of secondary reflection at the surface of the sheet opposite to that at which the silver or aluminum is applied.

It is an object of the present invention to provide improved light-splitting means by which the foregoing difficulties may be overcome. In brief, this is accomplished by combining a transparent base member of such character that double-image effects are inherently negligible with a reflection-enhancing coating of zinc sulfide, the latter substance being found to be characterized by a very low degree of light absorption.

Figure 1:
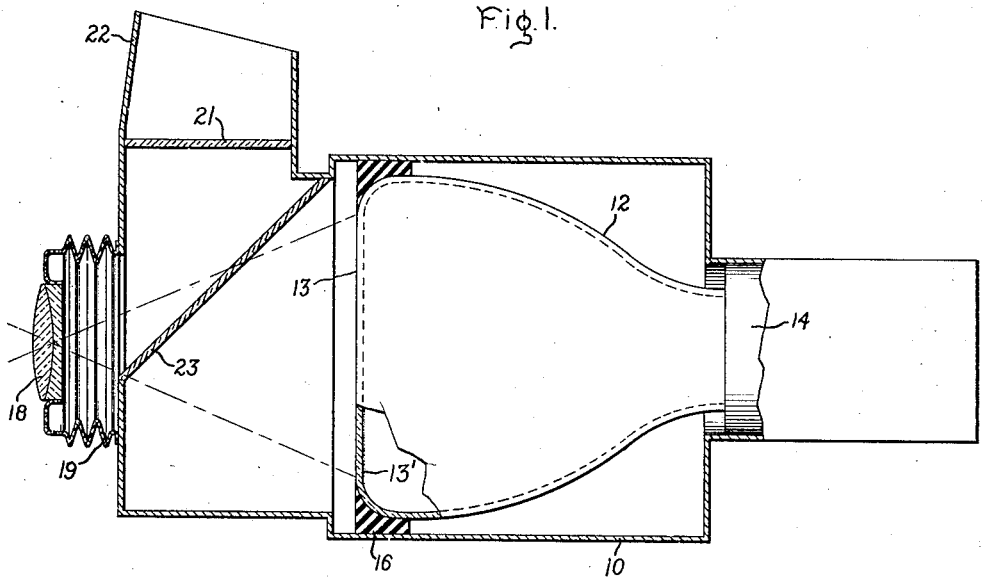
Figure 2:
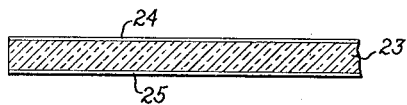
Figure 3:
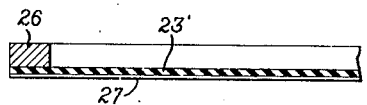

The features which I desire to protect herein are pointed out with particularity in the appended claim. The invention itself, together with further objects and advantages thereof, may best be understood by reference to the following description taken in connection with the drawing in which Fig. 1 represents schematically an apparatus suitably embodying the invention; Fig. 2 is an enlarged fragmentary section of one of the elements of Fig. 1; and Fig. 3 is a sectional view illustrating an alternative embodiment of the invention.

Referring particularly to Fig. 1, there is shown a so-called "television camera" 10 adapted to convert a visible scene into electrical signals which may be transmitted in any suitable way to a picture-reproducing agency such as a television receiver. The camera includes as a principal element a cathode ray tube 12 (only partially exposed in the drawing) which has a transparent end wall 13 provided internally at 13' with a photosensitive mosaic. The tube, which may suitably be of the type described and claimed in application Serial No. 360,610, filed October 10, 1940, in the name of H. M. Smith, further includes means (not shown) for producing a stream of electrons adapted to impinge on the inner surface of the wall 13 and an arrangement for deflecting the electron stream in two planes to cause it to scan the photosensitive mosaic. The deflecting means may comprise, for example, a magnetic structure positioned about the shaft of the tube as indicated at 14. The various internal elements of the tube are assumed to be provided with externally accessible terminals for connecting them in an appropriate electrical circuit. The tube is firmly supported within the casing 10 by means of a resilient frame indicated at 16.

In order to permit the scene being televised to be projected on the photosensitized end wall 13 of the tube 12 there is provided at one end of the camera casing a lens system 18 which is supported through an extensible bellows 19. In using the camera, it is of course desirable for the operator to be able to tell accurately the precise scene on which the camera lens is focused. This is accomplished in the present instance by providing in one of the lateral walls of the camera casing a viewing screen 21 which may consist, for example, of a sheet of glass having a frosted or etched surface and which is surrounded by a visor 22 serving to exclude unwanted light. In order to cause a replica of the televised scene to be projected on the viewing window 21, a light-dividing element 23 is provided between the lens 18 and the camera tube 12. It is the function of this element to cause a minor proportion of the light projected through the lens 18 to be reflected against the window 21, while permitting the remainder of the light to pass in unobstructed fashion to the television camera tube. In accordance with the present invention, this result is accomplished with a minimum loss of light and in such a way as to assure the production of a clear image at the viewing window by a particular construction of the element 23. In one embodiment of the invention the element comprises a sheet of glass of substantial thickness (say one-sixteenth of an inch) having on one surface thereof a thin uniform coating of zinc sulfide. The use of zinc sulfide in this connection proves highly advantageous for the reason that this material, while capable of reflecting light very effectively because of its high refractive index (about 2.3), absorbs it only to a very low degree if applied in a thin layer. Accordingly, if the thickness of the zinc sulfide coating applied to the element 23 is appropriately controlled, it is possible to cause the light impinging on the element to be effectively divided into reflected and transmitted components on a very efficient basis. That is to say, the sum of the reflected and transmitted components will represent a very high percentage of the total light available, approaching in some instances one hundred percent.

Production of a highly uniform and controlled coating of zinc sulfide may be accomplished, for example, by evaporating the sulfide under carefully regulated temperature conditions and causing the resultant vapor to deposit on the surface desired to be coated. Other factors which must be taken into account in the coating procedure comprise the time of vapor generation and the distance between the vapor source and the condensing surface. A suitable spacing of the vapor source and condensing surface has been found to be on the order of fifteen centimeters, although this is by no means a limiting condition. The evaporating procedure should be continued long enough to produce a deposit of zinc sulfide in the thickness range between about 10 Angstrom units and 500 Angstrom units (10 to 500 A.) depending upon the desired ratio of reflected to transmitted light. Using thicknesses within the limit specified, the ratio of reflection to transmission can be controlled in the range from about 1:9 to about 1:2.

In using a glass sheet as the supporting means for the zinc sulfide layer, some difficulty is encountered due to the formation of a confusing double image at the viewing screen 21, this being attributable to secondary reflection from the surface of the glass sheet opposite to that on which the zinc-sulfide coating is applied. Even with the thinnest glass considered practical this double-image effect may be quite troublesome. In order to overcome it my invention further provides means for minimizing reflection from the uncoated surface of the glass, such means consisting in one instance of a reflection-reducing superficial layer produced on the surface in question. In connection with glasses such as soda-lime glass, the reflection-reducing layer may best be formed as a deposit of an added material having a refractive index intermediate between that of the glass and air and a thickness on the order of a quarter wave length of light. A coating of this type may consist, for example, of a metallic fluoride, for instance, calcium fluoride applied by evaporation in the manner described in Cartwright and Turner Patent No. 2,207,656, granted July 9, 1940. If ordinary lead glass or barium glass is used, its surface may be treated with nitric acid to produce a relatively porous layer of quarter-wave thickness and low refractive index, (i. e., about 1.3). These expedients tend to reduce reflection from the treated surface to a negligible value and to assure that the light received at the viewing screen (in the case of a construction such as that of Fig. 1) shall be substantially confined to light reflected from the zinc sulfide layer, i. e., to the exclusion of light reflected from the opposite surface of the glass sheet.

A light dividing element of the character described above is illustrated in Fig. 2, which is a fragmentary sectional view and in which the thickness of the various layers has been very much exaggerated for purposes of clarity. In the figure referred to, 23 represents a sheet of glass, 24 is a very thin coating of zinc sulfide applied to one surface of the glass, and 25 is a reflection-reducing layer on the opposite surface of the glass.

The invention may be practiced in another way by forming the light-dividing element of a transparent material of sufficient thinness to assure that images reflected from its respective surfaces shall be substantially coincident as received at the viewing screen. It is hardly possible to employ glass for this purpose due to the inherent fragility of this material, but one may use, for example, thin pellicles formed of a synthetic resin. One method of preparing such pellicles has been described in my prior application Serial No. 357,829, filed September 29, 1940, as comprising the steps of dissolving synthetic resinous material in a volatile solvent, immersing a solid base member in the solution, withdrawing the base member from the solution to cause formation of a self-drying layer of the resinous material thereon, and finally placing the base member in a liquid in which the resin is insoluble in order to free the resinous layer from the base member and to float the freed layer on the surface of the liquid whence it may be picked up on an appropriate mounting element such as a metal frame. The resinous materials which may be used in the preparation of membranes of the character referred to include, among others, cellulose esters, such as nitrocellulose and cellulose acetate, and resinous compounds of the polyvinyl type, as exemplified by polyvinyl halides, by the copolymer of vinyl chloride and vinyl acetate, or by one of the reaction products of an aldehyde with a hydrolyzed polymerized vinyl ester. The last-named reaction products are known as "polyvinylal resins" and are described fully in Reissue Patent 20,430, Morrison et al. A typical polyvinylal resin and one which is considered especially suitable for the purposes of the present invention is that which is formed by condensing formaldehyde with the product of hydrolysis of polyvinyl acetate, the resultant product being conveniently designated polyvinyl formal.

In order to produce a pellicle of polyvinyl formal, a quantity of this material is dissolved in a suitable volatile solvent such as chloroform or ethylene dichloride. Thereafter, a base member consisting, for example, of a sheet of glass is immersed in the resin solution and subsequently withdrawn with a quantity of the solution adhering thereto as a thin coating. After evaporation of the solvent the resultant layer of solid resin may be stripped from the base member by immersing the latter in a liquid such as water and causing the layer to be floated to the surface of the liquid whence it may be picked up on a suitable frame.

The thickness of the pellicle thus formed may be controlled in various ways as by varying the concentration of the resin solution from which it is formed or by repeatedly dipping the base member in a relatively dilute solution to build up several resinous layers. For present purposes the thickness of the resinous pellicle should be less than about 250,000 Angstrom units (i. e., less than about .001") to assure the avoidance of troublesome double-image effects. A lower limit of thickness is, of course, imposed by the consideration that the pellicle must have sufficient strength to avoid rupture in normal use, and in view of this requirement it is advisable to use a pellicle of at least several thousand Angstrom units thickness. In some cases pellicles having superior physical properties may be obtained by combining two or more substances in superimposed layers. For example, a very strong, waterproof pellicle can be provided by sandwiching polyvinyl formal between layers of polyvinyl chloride.

A mounted pellicle of the character described above is represented on a very much enlarged scale in Fig. 3. In this figure, a section of the pellicle is indicated at 23' and a metal frame for supporting the pellicle at its edge is shown at 26. After the pellicle is mounted, it is provided on one surface with a thin coating 27 of zinc sulfide, applied to a thickness of from 10 to 500 Angstroms, for example by evaporation.

By the means described in the foregoing, light-dividing elements can be made having a ratio of reflected to transmitted light ranging from 1:9 to 1:2 with an efficiency above 95%. Moreover, either of the embodiments described assures that the picture obtained at the viewing screen shall be free of troublesome double-image effects. These considerations are of outstanding value in any optical system in which maximum utilization of the available light is important. For example, the use of the invention is considered beneficial not only in a television camera arrangement such as that specifically described herein, but also in high speed optical cameras and in object-illuminating arrangements for use in photomicrography and the like.

While the invention has been described by reference to particular embodiments, it should be understood that modifications may be made by those skilled in the art without actually departing from the invention. I, therefore, aim in the appended claim to cover all such equivalent variations as come within the true spirit and scope of the foregoing disclosure.

What I claim as new and desire to secure by Letters Patent of the United States is:

A camera comprising the combination of a casing, a lens, a cooperating photosensitive wall member, a viewing screen located in a position visible from the exterior and in non-obstructive relation to light reaching said photosensitive member through said lens, and a light-dividing element in such position in the path of said light that a portion of said light will be reflected upon said viewing screen producing thereon an image free from perceptible double image effects, said element comprising a sheet of transparent material having a thickness less than about 250,000 Å., and a coating on said sheet of zinc sulfide sufficiently thin to effectively transmit light.

VINCENT J. SCHAEFER.